(12) United States Patent
Saumer et al.

(10) Patent No.: US 9,949,307 B2
(45) Date of Patent: Apr. 17, 2018

(54) METHODS OF ADDING OR REMOVING A CONTROL INTO/OUT OF A NETWORK AND APPARATUS FOR CARRYING OUT SAID METHODS

(71) Applicant: SICK AG, Waldkirch (DE)

(72) Inventors: Markus Saumer, Waldkirch (DE); Klaus Weddingfeld, Waldkirch (DE)

(73) Assignee: SICK AG, Waldkirch (DE)

( * ) Notice: Subject to any disclaimer, the term of this patent is extended or adjusted under 35 U.S.C. 154(b) by 100 days.

(21) Appl. No.: 15/273,578

(22) Filed: Sep. 22, 2016

(65) Prior Publication Data

US 2017/0094705 A1    Mar. 30, 2017

(30) Foreign Application Priority Data

Sep. 24, 2015   (EP) ..................................... 15186611

(51) Int. Cl.
*H04W 76/02*   (2009.01)
*H04L 12/40*   (2006.01)
(Continued)

(52) U.S. Cl.
CPC ..... *H04W 76/023* (2013.01); *H04L 12/40169* (2013.01); *H04L 41/12* (2013.01);
(Continued)

(58) Field of Classification Search
None
See application file for complete search history.

(56) References Cited

U.S. PATENT DOCUMENTS 3,938,017 A * 2/1976 Hayes ................... G05B 11/42
236/78 D
2004/0133721 A1   7/2004 Ellerbrock
(Continued)

FOREIGN PATENT DOCUMENTS

DE   10 2011 086 054 A1   5/2013
WO      2011/002397 A1   1/2001

OTHER PUBLICATIONS

European Search Report dated Apr. 11, 2016 issued in corresponding European Application No. EP 15186611.

*Primary Examiner* — Brandon M Renner
(74) *Attorney, Agent, or Firm* — Nath, Goldberg & Meyer; Jerald L. Meyer

(57) ABSTRACT

To enable an addition or a removal of a control into or from a communication line without an interruption of the ongoing communication of the communication line, a method is provided of adding a control into a network of at least one first and one second control, which are provided for operating actuators, during an operation of the network, wherein the first and second controls are connected to one another in a communication line and communicate with one another via a first transmission connection of the first control and a second transmission connection of the second control; and wherein each control has an unambiguous identifier, comprising the steps of providing a third transmission connection and a fourth transmission connection between the control to be added and the first control to be connected upstream of the control to be added; providing a fifth transmission connection and a sixth transmission connection between the control to be added and the second control to be connected downstream of the control to be added; and activating the third to sixth transmission connections between the first and second controls and the control to be added on the simultaneous deactivation of the first and (Continued)

Figure 1:
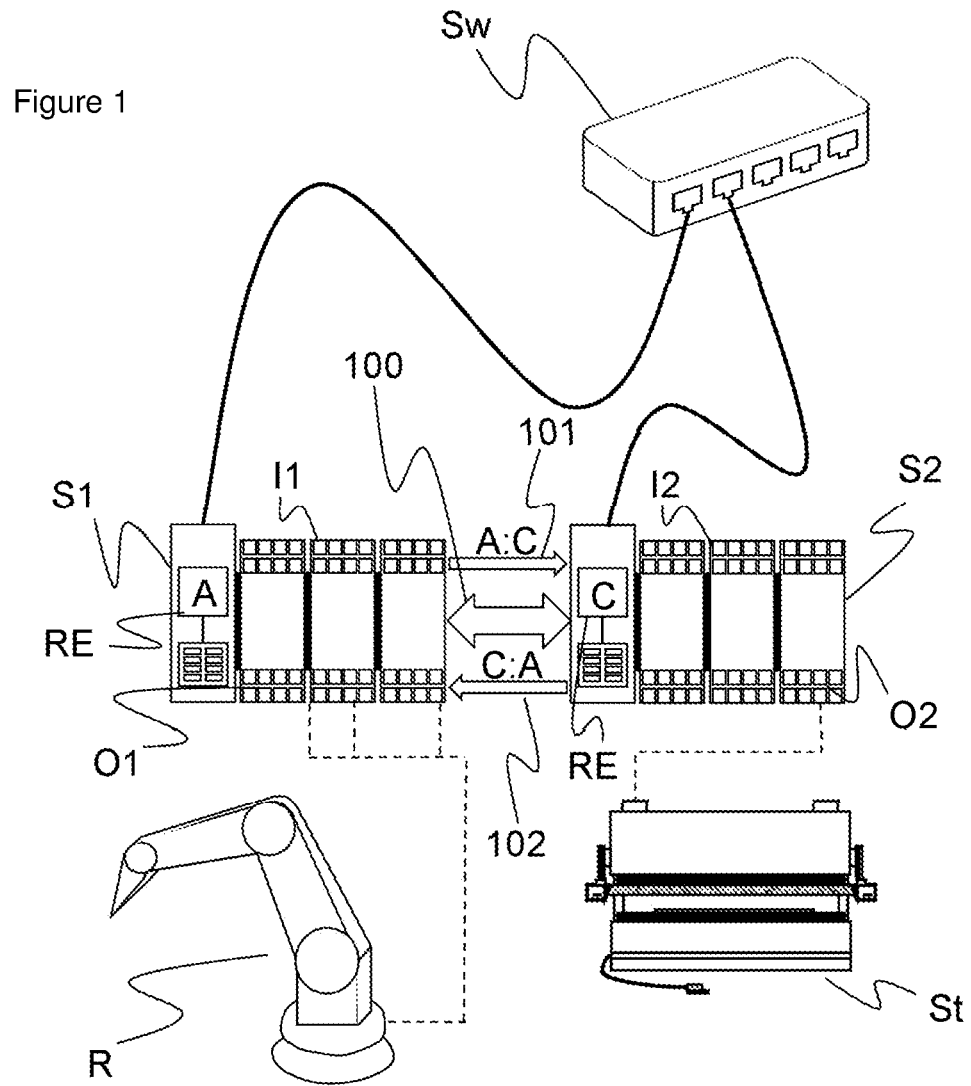

second transmission connections between the first and second controls and methods of removing a control from a network of at least one first and one second control and the control to be removed.

11 Claims, 3 Drawing Sheets

(51) Int. Cl.
*H04L 12/24* (2006.01)
*G05B 11/01* (2006.01)

(52) U.S. Cl.
CPC ............. *H04W 76/14* (2018.02); *G05B 11/01* (2013.01); *G05B 2219/31093* (2013.01)

(56) References Cited

U.S. PATENT DOCUMENTS

| | | | |
|---|---|---|---|
| 2011/0206367 A1* | 8/2011 | Gilbert | H04B 10/272 398/16 |
| 2012/0218023 A1* | 8/2012 | Trock | H03K 17/22 327/401 |
| 2013/0148527 A1* | 6/2013 | Awiniyi | H04W 24/02 370/252 |
| 2015/0087187 A1* | 3/2015 | Kifedjian | H01R 13/665 439/620.22 |
| 2017/0085648 A1* | 3/2017 | Aw | G08B 13/19656 |

* cited by examiner

METHODS OF ADDING OR REMOVING A CONTROL INTO/OUT OF A NETWORK AND APPARATUS FOR CARRYING OUT SAID METHODS

The invention relates to a method of adding a control into a network in accordance with claim 1 and to a method of removing a control from a network in accordance with claim 5 as well as to an apparatus for carrying out the methods in accordance with claim 9.

A total plant is made up of a plurality of modules in today's automation industry, with each module having at least one control and at least one actuator. A modification of the plant can be carried out simply and in a time-saving manner due to the modular structure of the plant.

The controls control the actuators such that the actuators carry out their associated task and optionally interact with one another. For this purpose, the controls are connected to one another via a communication network, preferably via an Ethernet-based network. The communication network can be controlled by a higher-ranking central control or can be set up by a line networking of the participating controls, i.e. the participating controls are connected to one another in a communication line (line concept).

When setting up or modifying the total plant, the total plant has to be programmed or reconfigured in accordance with the automated processing operation.

With a central control of the communication network, a maximum expansion or all the different module combinations of the total plant have to be known and stored in the central control. A change to the total plant, for example by adding a further control or by removing an existing control, requires an interruption of the communication of the total plant so that the modified communication paths in the communication network can be implemented in the central control.

With a line networking of the participating controls, a change in the setup of the total plant, for example by adding a further control or by removing an existing control, likewise requires an interruption of the communication of the total plant. An adaptation of the wiring of the communication line may be necessary in this respect. Furthermore, the adjacent controls of the added control or of the removed control have to be retaught with respect to their communication in the communication line.

It is therefore an object of the invention to provide a method of adding a control into a network or a method of removing a control from a network which enables the addition or the removal without an interruption of the ongoing communication of the communication line. It is furthermore an object of the invention to provide a control for carrying out a method of adding a control into a network or a method of removing a control from a network which enables the carrying out of the methods without an interruption of the ongoing communication of the communication line.

The object is satisfied in accordance with the invention by a method of adding a control into a network of at least one first control and one second control, which are provided for operating actuators, during an operation of the network, wherein the first and second controls are connected to one another in a communication line and communicate with one another via a first transmission connection of the first control and via a second transmission connection of the second control, and wherein each control has an unambiguous identifier, comprising the steps of providing a third transmission connection and a fourth transmission connection between the control to be added and the first control to be connected upstream of the control to be added, providing a fifth transmission control and a sixth transmission control between the control to be added and the second control to be connected downstream of the control to be added, and activating the third to sixth transmission connections between the first and second controls and the control to be added on the simultaneous deactivation of the first and second transmission connections between the first and second controls.

In accordance with a preferred embodiment, a respective third and fourth identifier pair are defined for the transmission connections between the control to be added and the first control from the respective identifiers of the control to be added and the first control.

In accordance with a further preferred embodiment, the third and fourth identifier pairs are stored in the control to be added and in the first control. This has the advantage that the communication connections for the controls connected in the communication line are unambiguous via the defined identifier pairs.

In accordance with a further preferred embodiment, a respective fifth and sixth identifier pair are defined for the transmission connections between the control to be added and the second control from the respective identifiers of the control to be added and the second control. The fifth and sixth identifier pairs are advantageously stored in the control to be added and in the second control.

The advantage results from this that the communication connections between the control to be added and the control connected upstream or the control connective downstream can be unambiguously determined via the defined identifier pairs.

The object is furthermore satisfied in accordance with the invention by a method of removing a control from a network of at least one first control and one second control and the control to be removed, which are provided for operating actuators, during an operation of the network, wherein the controls are connected to one another in a communication line, wherein the control to be removed is arranged between the first and second controls, wherein the first control is connected to the control to be removed via a third transmission connection, wherein the control to be removed is connected to the first control via a fourth transmission connection and to the second control via a fifth transmission connection, and wherein the second control is connected to the control to be removed via a sixth transmission connection, and wherein each control has an unambiguous identifier, comprising the steps of providing a first transmission connection and a second transmission connection between the first and second controls and activating the first and second transmission connections between the first and second controls on the simultaneous deactivation of the third to sixth transmission connections between the control to be removed and the first control connected upstream of the control to be removed and the second control connected downstream of the control to be removed.

In accordance with a preferred embodiment, a respective first and second identifier pair are defined for the first and second transmission connections from the respective identifiers of the first and second controls.

In accordance with a further preferred embodiment, the first and second identifier pairs are stored in the first and second controls.

The object is furthermore satisfied in accordance with the invention by a control for carrying out one of the above methods, wherein the control can be added into or removed from a network having controls, comprising an input unit and an output unit for communicating with at least one further control and a processor unit for recognizing an identifier of the further control and for setting up a transmission connection to the further control, wherein the processor unit sets up an identifier pair from its own identifier and the identifier of the further control for the transmission connection and stores the set up identifier pair in a memory unit, and wherein the processor unit is provided for activating or deactivating the transmission connection to the further control during an operation of the network.

In accordance with a preferred embodiment, the control is connectable to an Ethernet-based switch and can be connected to the further control via the switch.

In accordance with a further preferred embodiment, the processor unit communicates a readiness to activate the transmission connections after the setting up thereof or a readiness to deactivate the transmission connections to the other control.

The method in accordance with the invention and the control can be designed in a similar manner by further features and show similar advantages in this respect. Such further features are described by way of example, but not exclusively, in the dependent claims following the independent claims.

Figure 2:
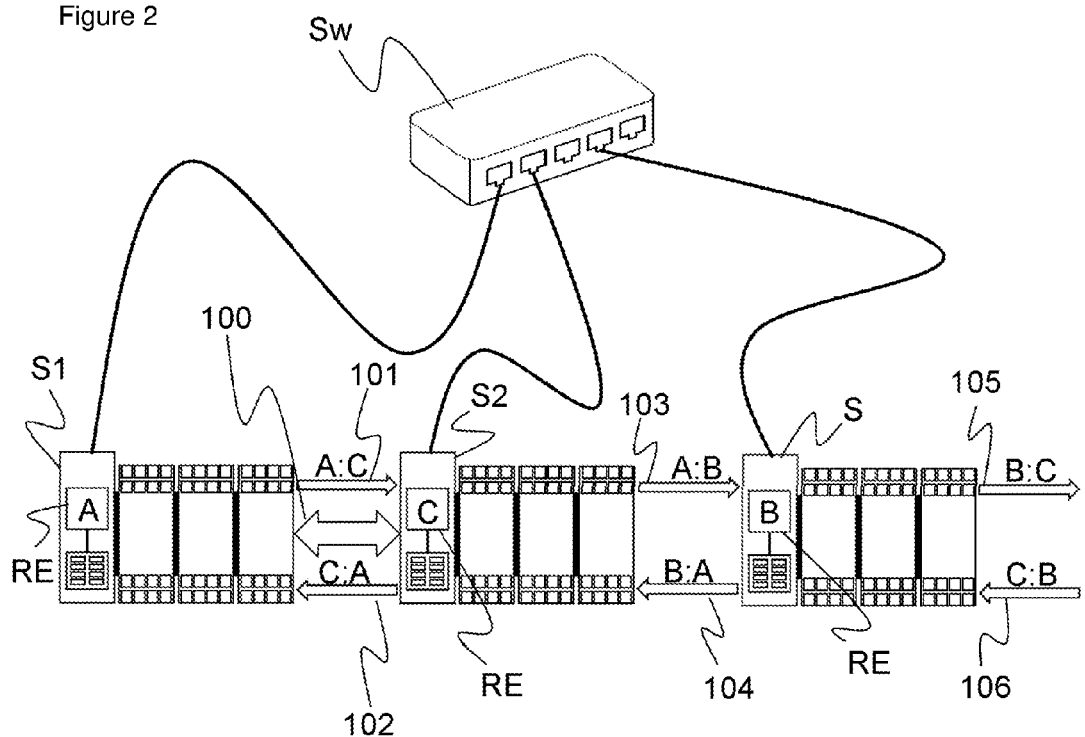
Figure 3:
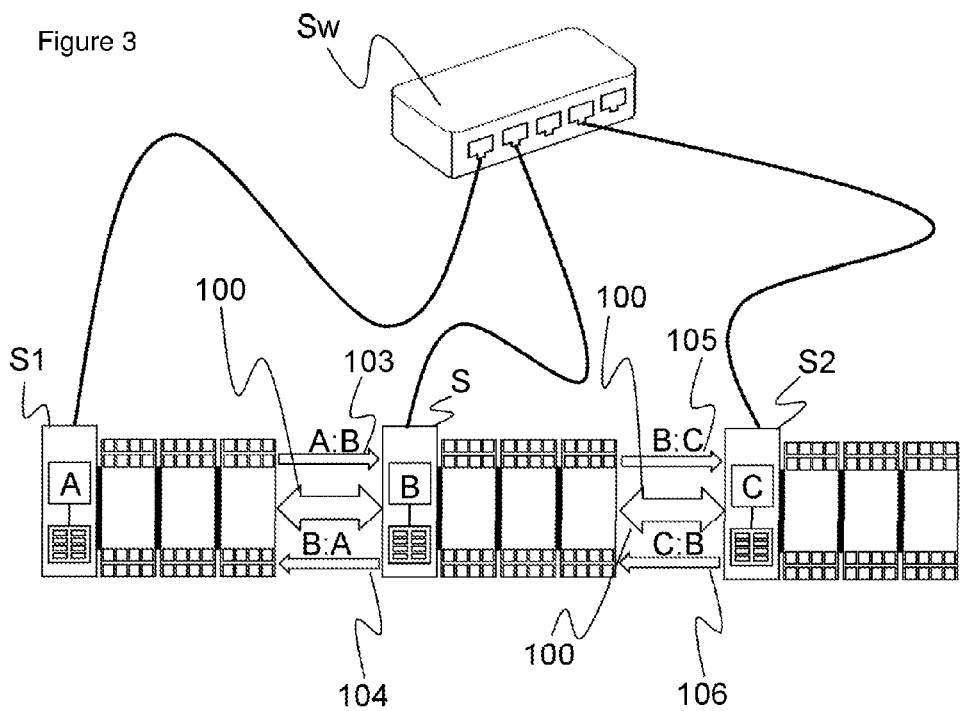
Figure 4:
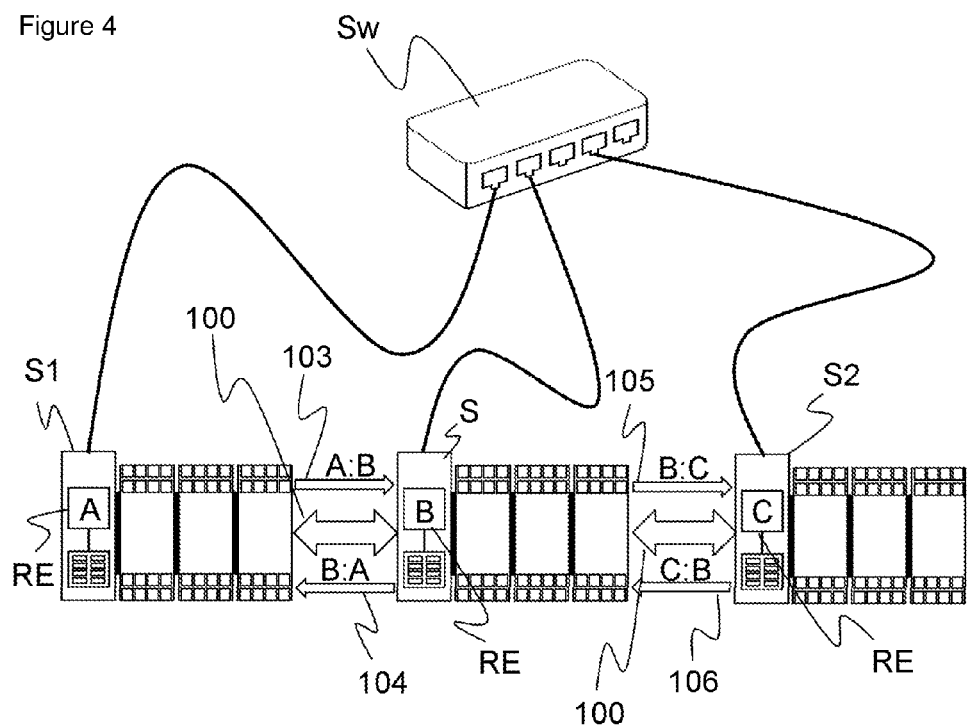
Figure 5:
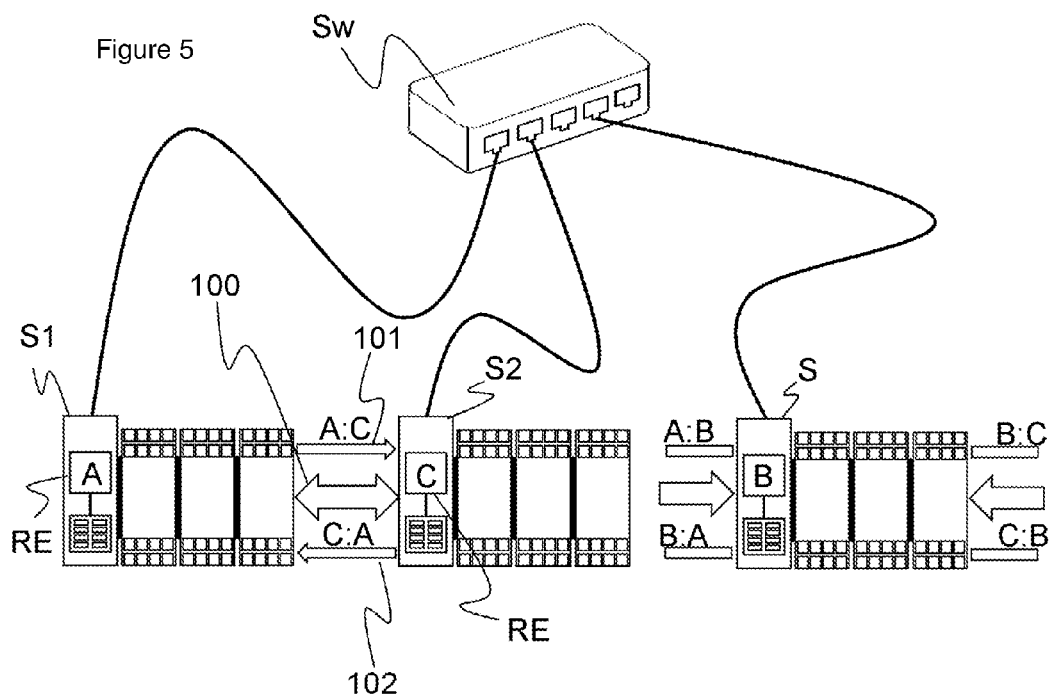

The invention will also be explained in the following with respect to further advantages and features with reference to the enclosed drawing and to embodiments. The Figures of the drawing show in:

FIG. 1 a schematic representation of a communication line of an automation plant;

FIGS. 2, 3 a schematic representation of an addition in accordance with the invention of a control into the communication line of the automation plant; and FIGS. 4, 5 a schematic representation of a removal in accordance with the invention of a control from the communication line of the automation plant.

FIG. 1 schematically shows an automation plant which is set up from a first control S1 and a second control S2 and from a first actuator controlled by the first control S1 and a second actuator controlled by the second control S2. The first control S1 controls the first actuator shown by way of example as a robot arm R. The second control S2 controls the second actuator shown by way of example as a die St.

The first and second controls S1 and S2 are connected to one another in a communication line 100 and communicate by means of a first transmission connection 101 and a second transmission connection 102. In this respect, the first control S1 communicates with the second control S2 by means of the first transmission connection 101. The second control S2 communicates with the first control S1 by means of the second transmission connection 102.

The first and second controls S1 and S2 each have an unambiguous identifier. The first control S1 has the identifier A and the second control S2 has the identifier C. The identifier serves the controls S1 and S2 as an addressing for identifying the controls S1 and S2 in the communication line 100 so that the position and the tasks of the associated controls S1 and S2 in the communication line 100 can preferably be communicated by means of the identifier. I.e. the order of the controls S1 and S2 in the communication line 100 is unambiguously determined by the identifiers A and C so that a network is formed from the first and second controls S1 and S2.

Each control S1 and S2 has an input unit I1 and a I2 and an output unit O1 and O2 to communicate with one another. Furthermore, each control S1 and S2 has a processor unit RE which serves for recognizing the identifiers A and C of the connected controls S1 and S2. The processor unit RE sets up a first identifier pair A:C for the transmission connections 101 of the first control S1 and a second identifier pair C:A for the transmission connection 102 of the second control S2 from the identifiers A and C of the connected controls S1 and S2 of the communication line 100. The processor unit RE stores the set up identifier pairs A:C and C:A in a memory unit of the respective first and second controls S1 and S2 such that the first and second transmission connections 102 and 102 of the controls S1 and S2 are known and can be unambiguously associated.

An addition in accordance with the invention of a control S to be added into the described communication line 100 is shown schematically between the first and second controls S1 and S2 in FIG. 2. The control S to be added has an identifier B.

The method in accordance with the invention provides a fourth transmission connection 104 for the control S to be added, said transmission connection being intended to enable a communication of the control S to be added with the first control S1. A third transmission connection 103 between the control S to be added and the first control S1 is provided, with the first control S1 being able to communicate with the control S to be added via the third transmission connection 103.

The processor unit RE of the controls S1 and S sets up a corresponding identifier pair A:B and B:A from the identifiers of the first control S1 and the control S to be added for the respective transmission connections 103 and 104. I.e. the processor unit RE stores a third identifier pair, called A:B, for the third transmission connection 103 in the memory unit. The processor unit RE stores a fourth identifier pair. called B:A, for the fourth transmission connection 104 in the memory unit.

The third and fourth transmission connections 103 and 104 for the first control S1 and the control S to be added can be unambiguously associated in the network by means of the identifier pairs A:B and B:A.

Furthermore, the method in accordance with the invention provides a fifth transmission connection 105 for the control S to be added which is intended to enable a communication of the control S to be added with the second control S2. The processor unit RE sets up a fifth identifier pair, called B:C, for the fifth transmission connection 105 from the respective identifiers B and C and stores it in the memory unit of the control S to be added.

A sixth transmission connection 106 between the control S to be added and the second control S2 is provided via which the second control S2 can communicate with the control S to be added. The processor unit RE sets up a sixth identifier pair, called C:B, from the identifiers B and C of the controls S2 and S to be connected and stores it in the memory unit of the control S to be added.

After setting up the third to sixth transmission connections 103 to 106, the required connections for the communication line 100 are set up and an addition of the control S to be added is possible between the first and second controls S1 and S2.

A readiness of the addition of the control S to be added in the communication line 100 is advantageously communicated by the control S to be added so that the third to sixth transmission connections 103 to 106 between the first and second controls S1, S2 and the control S to be added are activated during the operation of the network and the existing first and second transmission connections 101 and 102 between the first and second controls S1 and S2 are deactivated.

As shown in FIG. 3, the control S to be added is added without a communication interruption of the network between the first and second controls S1 and S2 by the simultaneous activation of the newly provided transmission connections 103 to 106 and the deactivation of the existing transmission connections 101 and 102.

The transmission connections 101 to 106 can be unambiguously associated for all connected controls S1, S2 and S through the stored identifier pairs of the transmission connections 101 to 106.

In accordance with the method in accordance with the invention, the network is not restricted to two controls S1 and S2. The network can have a plurality of controls which are connected, in particular connected in series, to an Ethernet-based communication line.

FIG. 4 shows an alternative embodiment of the method in accordance with the invention for removing a control from a network of three controls of an automation plant. In this respect, the method in accordance with the invention is not restricted to the number of three controls in the network. The number of connected controls can be as high as desired.

The actuators associated with the automation plant are not shown for reasons of clarity and the same components have the same reference numerals as in the previous Figures.

The automation plant shown has three controls which are connected in series to a communication line 100. The first control S1 has a third transmission connection 103 to the control S to be removed via which the first control S1 communicates with the control S to be removed. The control S to be removed has a fourth transmission connection 104 to the first control S1 via which the control S to be removed communicates with the first control S1.

The processor unit RE set up a respective third and fourth identifier pair from the identifiers A and B of the first control S1 and of the control S to be removed for the third and fourth transmission connections 103 and 104, with the third identifier pair being called A:B and the fourth identifier pair being called B:A. The identifier pairs A:B and B:A are stored in the respective controls S1 and S.

The control S to be removed furthermore has a fifth transmission connection 105 to the second control S2 via which the control S to be removed communicates with the second control S2. At the other side, the second control S2 has a sixth transmission connection 106 to the control S to be removed via which the second control S2 communicates with the control S to be removed.

The processor unit RE sets up a respective fifth and sixth identifier pair from the identifiers B and C of the second control S2 and the control S to be removed for the fifth and sixth transmission connections 105 and 106, with the fifth identifier pair being called B:C and the sixth identifier pair being called C:B. The identifier pairs B:C and C:B are stored in the respective controls S2 and S.

The first and second controls S1, S2 and the control S to be removed from the communication line 100 of the automation plant via the provided transmission connections 103 to 106.

On a change of the automation plant by removing the control S to be removed from the communication line 100, the method in accordance with the invention provides that the first control S1 sets up a first transmission connection 101 to the second control S2, with the set up first transmission connection 101 being inactive for the communication line 100. Furthermore, a second transmission connection 102 from the second control S2 to the first control S1 is provided by the method in accordance with the invention. The second transmission connection 102 also initially remains inactive for the communication line 100.

The processor unit RE sets up a corresponding first and second identifier pair from the identifiers A and C of the first and second controls S1 and S2 for the respective first and second transmission connections 101 and 102, with the first identifier pair being called A:C and the second identifier pair being called C:A. The first and second identifier pairs A:C and C:A are stored in the first and second controls S1 and S2.

After the setting up of the first and second transmission connections 101 and 102 between the first and second controls S1 and S2, a removal of the control s to be removed can be carried out during an ongoing operation of the communication line 100 of the network. For this purpose, the first and second transmission connections 101 and 102 between the first and second controls S1 and S2 are activated, with the third to sixth transmission connections 103 to 106 between the control S to be removed and the first control S1 connected upstream of the control S and the second control S2 connected downstream of the control S to be removed being deactivated simultaneously.

The control S to be removed is thus removed from the communication line 100 of the network. The communication between the first and second controls S1 and S2 of the remaining communication line 100 of the network is maintained without interruption via the first and second transmission connections 101 and 102.

The methods in accordance with the invention of adding or removing a control S are in particular stored or saved as programs in the controls S1, S2 and S. The controls S1, S2 and S are preferably connected to an Ethernet-based switch Sw and are connected to one another via the switch Sw.

The control S to be added or to be removed can communicate its inclusion in the communication line 100 or its removal from the communication line 100 of the network to the first and second controls S1 and S2 by means of a signal over the switch Sw so that the corresponding method in accordance with the invention can be activated.

REFERENCE NUMERAL LIST 100 communication line
101 first transmission connection
102 second transmission connection
103 third transmission connection
104 fourth transmission connection
105 fifth transmission connection
106 sixth transmission connection
A, B, C identifiers of the controls
A:B third identifier pair
A:C first identifier pair
B:A fourth identifier pair
B:C fifth identifier pair
C:A second identifier pair
C:B sixth identifier pair
I1, I2 input unit
O1, O2 output unit
R robot
RE processor unit
S control to be added or to be removed
S1 first control
S2 second control
St die
Sw switch

The invention claimed is:

1. A method of adding a control into a network of at least one first and one second control, which are provided for operating actuators, during an operation of the network, wherein the first and second controls are connected to one another in a communication line and communicate with one another via a first transmission connection of the first control and a second transmission connection of the second control; and wherein each of the first and second controls and the control to be added has an unambiguous identifier, the method comprising the steps of:
providing a third transmission connection and a fourth transmission connection between the control to be added and the first control to be connected upstream of the control to be added;
providing a fifth transmission connection and a sixth transmission connection between the control to be added and the second control to be connected downstream of the control to be added; and
activating the third to sixth transmission connections between the first and second controls and the control to be added on the simultaneous deactivation of the first and second transmission connections between the first and second controls.

2. The method in accordance with claim 1, wherein a respective third and fourth identifier pair are defined for the third and fourth transmission connections between the control to be added and the first control from the respective identifiers of the control to be added and the first control.

3. The method in accordance with claim 2, wherein the third and fourth identifier pairs are stored in the control to be added and in the first control.

4. The method in accordance with claim 1, wherein a respective fifth and sixth identifier pair are defined for the fifth and sixth transmission connections between the control to be added and the second control from the respective identifiers of the control to be added and the second control.

5. The method in accordance with claim 4, wherein the fifth and sixth identifier pairs are stored in the control to be added and in the second control.

6. A method of removing a control from a network of at least one first and one second control and the control to be removed, which are provided for operating actuators, during an operation of the network, wherein the controls are connected to one another in a communication line; wherein the control to be removed is arranged between the first and second controls; wherein the first control is connected to the control to be removed via a third transmission connection; wherein the control to be removed is connected to the first control via a fourth transmission connection and to the second control via a fifth transmission connection; and wherein the second control is connected to the control to be removed via a sixth transmission connection; and wherein each control has an unambiguous identifier, the method comprising the steps of:
providing a first transmission connection and a second transmission connection between the first and second controls; and
activating the first and second transmission connections between the first and second controls on a simultaneous deactivation of the third to sixth transmission connections between the control to be removed and the first control connected upstream of the control to be removed and the second control connected downstream of the control to be removed.

7. The method in accordance with claim 6, wherein a respective first and second identifier pair for the first and second transmission connections are identified from the respective identifiers of the first and second controls.

8. The method in accordance with claim 7, wherein the first and second identifier pairs are stored in the first and second controls.

9. A control for carrying out a method of adding a control into a network in accordance with claim 1 and for carrying out a method of removing a control from a network in accordance with claim 6, wherein the control can be added into or removed from a network having controls, the control comprising:
an input unit and output unit for communicating with at least one further control; and
a processor unit for recognizing an identifier of the further control and for setting up a transmission connection to the further control, wherein the processor unit sets up an identifier pair for the transmission connection from its own identifier and the identifier of the further control and stores the set up identifier pair in a memory unit;
and wherein the processor unit is provided for activating or deactivating the transmission connection to the further control during an operation of the network.

10. The control in accordance with claim 9, wherein the control is connectable to an Ethernet-based switch and can be connected to the control via the switch.

11. The control in accordance with claim 9, wherein the processor unit communicates a readiness to activate the transmission connection after the setting up thereof or a readiness to deactivate the transmission connection to the other control.

* * * * *